July 18, 1939. P. M. STIVENDER 2,166,187
ELECTRICAL POWER SYSTEM
Original Filed Dec. 26, 1933
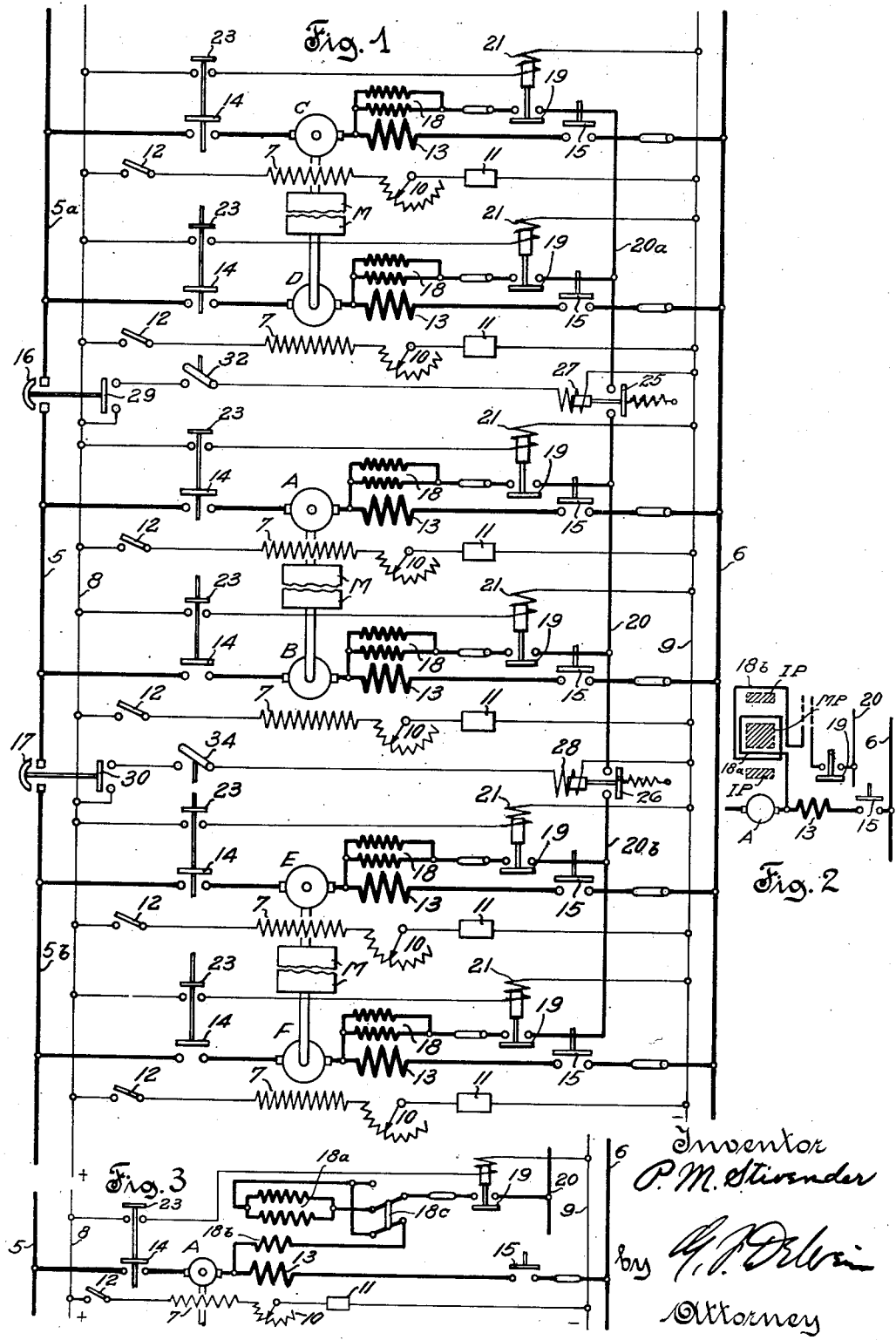

Patented July 18, 1939

2,166,187

UNITED STATES PATENT OFFICE 2,166,187

ELECTRICAL POWER SYSTEM

Paul M. Stivender, West Allis, Wis., assignor to Allis-Chalmers Manufacturing Company, Milwaukee, Wis., a corporation of Delaware Application December 26, 1933, Serial No. 703,927
Renewed July 21, 1938

18 Claims. (Cl. 171—312)

This invention relates in general to electrical power systems, and it has more particular relation to a system embodying a plurality of direct current dynamo-electric machines arranged to supply energy to or drive a common load.

With a plurality of direct current machines, particularly machines of the shunt type, whether of self or separate excitation, connected to supply energy to or drive a common load, it is quite difficult in the ordinary installation to have the several machines divide or share the common load in a definite or predetermined proportion, usually depending on the capacity of the respective machines, throughout any considerable range of load variation; and the greater the number of parallel connected machines used to supply or drive a common load, the greater the difficulty is in maintaining a proper division of load between the several machines, and hence the greater the danger of subjecting one or more of the machines to undesirable or injurious overloading.

The present invention contemplates an electrical power system involving a plurality of dynamo-electric machines arranged to supply energy to or drive a common load, with provisions for insuring that the common load may be distributed between the several machines in a substantially constant proportion over the working range of the total load. And the invention contemplates provisions whereby the desired distribution of load between the several machines may be attained with any selected number of said machines connected for operation in parallel as a part of the system, and, preferably, whereby the desired regulating effects on the several machines to insure desired load distribution are attained through regulation of the field energizing effects produced through auxiliary field windings of the machines, with minimum consumption of power in such windings.

It is an object of the present invention to provide an improved electrical power system wherein a plurality of dynamo-electric machines are arranged to supply energy to or drive a common load and each active machine is regulated as to field energizing effects thereof in a manner dependent on or related to the load on the several active machines, so as to insure a desired substantially uniform distribution of the total load on the several active machines throughout wide variation in the value of such load.

It is a further object of the present invention to provide an improved electrical power system of the hereinabove described general character wherein desired load distribution effects are attained through use of windings on the several machines having a characteristic of series windings and producing energizing effects dependent on the unbalance of load on the machines of the system, and with minimum consumption of energy for securing desired regulating effects.

It is a further object of the present invention to provide an improved electrical power system of the hereinabove described general character wherein any desired plural number of machines may be satisfactorily controlled to secure the desired substantially constant relative distribution of loads thereon, and wherein the operation of connecting one of the machines actively in the system is effective to cause said machine to come under control of the other machine or machines already in operation so as to insure desired load regulation of the newly connected machine as well as the other machine or machines already in operation, to the end of securing the desired distribution of load on all of such machines in active service at a particular time in the system.

These and other objects and advantages are attained by the present invention, various novel features of which will be apparent from the description and drawing, disclosing an embodiment of the invention, and will be more particularly pointed out in the claims.

In the drawing: Fig. 1 represents a diagrammatic showing of an electrical power system embodying features of the present invention; and Figs. 2 and 3 show details of embodiments of the invention.

In the embodiment of the invention illustrated in the drawing, machines A, B, C, D, E and F may be considered as generators, operative, with their terminals suitably connected, to supply energy to a common load or distribution system, indicated at 5, 6, and this distribution system may be considered as supplying one or several motors arranged to drive a mill or increments of a continuous mill, such as is used for rolling steel. Each generator may be driven by an individual motor M or several generators, such as the pair A and B, the pair C and D, or the pair E and F, may be driven by a single motor M.

Each of the several generators may be of conventional type as to the armature and magnetic field element, the latter including main field poles and commutating poles disposed intermediate adjacent main field poles, and having a main field winding, indicated at 7, disposed on the main field poles, this main field winding being of the shunt type supplied from a separate source 8, 9 of suitable voltage which may be furnished by a single exciter unit; and an adjustable regulator-rheostat 10 is provided in the circuit of each field winding 7 for varying the value of the effective energizing current therein. This regulator-rheostat 10 may preferably be wholly or partly of known automatic motor-operated type which may be set for and secure a degree of field energization of the particular generator required to produce a predetermined voltage at the terminals of the generator. An automatic voltage regulator 11, which may be of conventional relay type, may, as desired, also be provided for maintaining the voltage constant at any value generally corresponding to the setting of the automatic regulator-rheostat 10. A cutout switch 12 may be provided in the field circuit of each machine. Each machine is provided with an auxiliary winding in the form of an interpole or commutating winding surrounding or otherwise disposed in conventional manner in magnetic flux inducing relation to the commutating poles and, if desired, a suitable compensating winding having the coils thereof bridging and in magnetic flux inducing relation with the polar face portions of adjacent main field poles in conventional manner, the auxiliary winding, indicated at 13, being connected in series relation with the armature winding of the machine and hence carrying current which varies as the armature current under normal conditions.

The generators A and B are each provided with a line circuit closing switch or switches 14, 15 for connecting the machine terminals to the power buses 5 and 6; and the generators C and D with like line switches 14, 15 for connecting the terminals of these machines to the power bus 6 and an auxiliary or sectional power bus 5a; and the generators E and F are provided with like line switches 14, 15 for connecting the latter machines to the power bus 6 and the sectional or auxiliary power bus 5c.

The power bus 5 may be considered as a main power bus, and the sections 5a and 5b as auxiliary buses capable of being connected to the main bus 5 by tie circuit breakers 16 and 17, respectively, of conventional type, when it is desired that one or both generators of the sets C and D and E and F, respectively, are to be connected to supply energy to the main power bus.

In spite of the fact that great care may be exercised in the design and adjustment of the several generators for the purpose of causing each to furnish a definite proportion of the load when the several generators are connected to supply power to the buses 5, 5a, 5b and 6, and even though voltage regulating devices are provided for the several machines to secure automatic adjustment of the energization of their main field windings, it is extremely difficult to maintain the desired proportional division of the load on the several parallel connected machines as the load varies to a substantial extent.

Desired effects in the matter of insuring a substantially constant proportional distribution of the load on the several machines connected to the power bus may be attained through providing each of the machines with a regulating field winding 18 disposed on the main field poles of each machine, preferably in a plurality of parallel connected sections as indicated, particularly where the machines are of considerable size, this regulating field winding being connected to the armature circuit of the machine preferably between the series winding (interpole winding 13) thereof and the corresponding armature terminal, and, through a switch 19, to the appropriate section of an equalizer bus circuit 20, 20a, 20b, as indicated in the drawing. The regulating field winding 18 of each generator is so disposed on the main field poles of the generator that, on flow of current through the regulating winding from the terminal of the generator to which the regulating winding is connected, the latter has a magnetizing effect on such main field poles which is differential with respect to the magnetizing effect of the main field winding on these poles, and, on flow of current in an opposite direction through the regulating winding, the magnetizing effect of the latter winding on the main field poles is cumulative with respect to that of the main field winding. The regulating field windings 18 of generators A and B are adapted to be connected through switches 19 to the equalizer bus section 20, and the regulating field windings 18 of the machines C and D are connectable to the bus section 20a through similar switches 19, and the regulating field windings 18 of the machines E and F are connectable to the bus section 20b through similar switches 19. The desired closing operation of each switch 19, to connect the regulating field winding 18 to the corresponding equalizer bus section when the particular generator is connected to its power bus section, may be secured through an electromagnet having an energizing winding 21 whose circuit is closed through back contactor 23 associated with the switch 14, the circuit of the energizing winding 21 being supplied from the exciter bus 8, 9, as indicated, or other source of suitable voltage. The association between each line switch 14 and its back contactor 23 is such as causes closure of such contactor when the line switch is moved to closed position.

The equalizer bus sections 20a and 20b are connectable to equalizer bus section 20 by switches 25 and 26, respectively, these latter switches being shown as biased to open position, as by a spring, and actuated to closed position by electromagnets the circuits of whose energizing windings 27, 28 are arranged to be closed by back contactors 29, 30, associated with the tie breakers 16, 17, respectively, when such tie breakers are closed to connect the auxiliary power bus sections 5a and 5b, respectively, to the main power bus 5.

Assume that the several machines are at rest, and it is desired to place one or both of the generators of one pair, such as A and B, in operation. With the generator or generators brought up to normal speed by the driving motor or motors M, the appropriate generator line switches 14, 15 may be closed; and contactor 23, through association with corresponding switch 14, closes the circuit of energizing coil or coils 21, causing closure of corresponding switch or switches 19, thus connecting the regulating windings 18 of the two machines through the equalizer bus section 20. Assume that both generators A and B have thus been brought up to speed and connected to the power bus, and the circuits of the main field windings of the generators are closed, the voltage of these generators may be built up to desired normal value, by suitable setting and action of the regulator-rheostats 10, which are preferably arranged for gang operation. As the voltage builds up to the desired predetermined value, the automatic voltage regulators 11 come into action to maintain the desired voltage conditions. Even under no load conditions, particularly before the automatic voltage regulators come into action, there is possibility of an unbalanced condition, usually due to or contributed to by differences in residual voltage of the several generators, this causing a current to circulate through the regulating windings 18 of the several machines; and the effect of this circulating current is to minimize any unbalanced condition.

With the machines A and B supplying energy to the power buses 5, 6, the several voltage regulators operate to maintain substantially constant voltage on the respective generators during variation in load thereon. And with the desired normal proportional distribution of load on the several machines, there is no appreciable current flowing in the equalizing bus section 20 and the regulating field windings 18 of the machines. However, due to different causes, such as a difference in the speed of action of the voltage regulators of the several generators in taking care of load variations, and differences in design of the machines which cause different heating effects therein during operation under different loads, there is likely to occur at times unbalance or disturbance of the normal or desired division of load upon the several machines, one of the machines tending to take more than its proper share and tending to cause further disturbance of the desired balance of load on the machines. However, with the regulating field winding 18 on each of the machines A and B in circuit, connected through the equalizer bus section 20, the effect of an increase or decrease in the proportionate share of the total load carried by any machine is reflected on the field regulating windings 18 of both machines, to cause the loads on the several machines to be brought back toward normal desired balance.

Assume that the load on machine A momentarily increases so as to destroy the normal balance of load distribution. Such increase in load on the machine A causes a current to circulate through the regulating field winding 18 of the machine A, the equalizer bus section 20 and the regulating field winding 18 on the machine B, the direction of flow of this current in the field winding 18 of the machine A being such as to oppose the field energization due to the main field winding, and this circulating current in the regulating field winding 18 of the generator B having an effect which is cumulative with respect to that of the main field winding of this generator, the final result, through this compensation of energizing effects, being to reduce the load on the machine A and increase the load on the machine B, thus again bringing the loads on the two machines toward values corresponding to the desired normal balance of load.

While tie breakers 16, 17 are shown only in connection with the power bus 5, the power bus 6 may be sectionalized to correspond with the sections 5, 5a, 5b and tie breakers similar to and operated simultaneously with the tie breakers 16, 17 may be used to connect sections of the power bus 6 to which the several pairs of generators are connected.

Either of the several pairs of generators C and D or E and F may be brought into action, as described in connection with generators A and B, and used at any time to supply a load on its own sectional power bus 5a or 5b, respectively, these machines then operating with their regulating field windings 18 connected through switches 19 and equalizer bus 20a or 20b, in a manner described hereinabove in connection with the generators A and B to maintain desired balance of load on the several parallel connected machines of the pair.

Assume that the generators A and B are in operation, supplying energy to a common load connected to power bus 5, 6, and that it is desired to have one or both pairs of generators C and D and E and F also supply power to the common load. After the generators of the additional set or sets are brought up to normal speed and with the main field circuit of each generator connected to its supply, and the automatic regulator-rheostat 10 adjusted to correspond with normal desired voltage, the line switches 14, 15 are closed; and, through the action of the back contactors 23 and energizing coils 21, the switches 19 are closed, thus connecting the regulating windings 18 of the pair or pairs of generators to the corresponding equalizing bus section 20a or 20b. The appropriate one or both of the tie circuit breakers 16, 17 are now closed, thus connecting one or both of the auxiliary power bus sections 5a, 5b to the main power bus section 5. Closure of one or both the tie breakers 16, 17 causes closure, through the action of the corresponding back contactors 29, 30, respectively, in the circuit of the energizing coils 27, 28, effecting closure of the appropriate one or both of switches 25 and 26, and connection of the appropriate one or both of the equalizer bus sections 20a and 29b to the equalizer bus section 20, thus establishing an equalizing connection, through the regulating field windings 18 of all of the machines connected to the power bus.

With these latter connections of the several generators, the machines are caused to assume and maintain a predetermined desired distribution of load thereon. If for any reason one machine momentarily assumes a greater proportion of the total load than corresponds to its normal share, the incidental increase in potential of the point of connection of the winding 18 to the armature circuit of such generator causes a current to circulate through the equalizer field winding 18 of such generator which opposes the field magnetizing effect of the main field winding 7, and this current flows through the regulating field windings 18 of the other generators in a direction to augment the field energization due to the main field windings 7 of such machines, the result being to decrease the field energization and load on the overloaded machine and to increase the load on the other machines, the final result being to bring back all of the machines to or toward a condition of desired balance or distribution of load.

Any pair of machines, C and D or E and F, may be disconnected from the power bus by opening the tie breaker 16 or 17, this action causing opening of the equalizer switch 25 or 26, respectively, through opening of contactors 27 or 28, respectively. Or, with the tie breakers 16, 17 left closed, one or both machines of each pair may be disconnected from the power bus by opening the corresponding line switches 14, 15, this action also resulting, through the action of the contactors 23 and energizing coils 21, in opening the corresponding switch or switches 19 and disconnecting the regulating windings 18 of the disconnected machine or machines from the equalizer bus; and the machines which remain connected to the power bus will continue to maintain their desired division of load in a manner which will be apparent from the above description.

The regulating field windings 18 of the several machines are of such dimensions as to provide the desired regulating components of field energization of the machines, these windings, in the case of two generators of equal capacity, preferably being of the same number of effective turns to provide, with the same current flowing therein, equal voltage and load equalizing effects in the proper direction on the several generators. With machines of different capacities, the numbers of turns and relative energizing effects of the regulating windings are suitably determined or adjusted to cause energy of an overloaded generator to produce the desired decrease of field energization and load on such generator and increase in energization and load on the other generator or generators, to the end of securing a desired substantially constant proportional distribution of the load on the several machines. With generators of equal capacity, quite satisfactory regulating results are attainable with the regulating windings 18 designed to have an ampere turn strength of appreciably less than 10 per cent of that of the main field 7 if a current equal to full load current were circulating between the two generators through their several windings connected to the armature circuits. It is advantageous to arrange each regulating field winding in a plurality of parallel branches; but the number of such parallel branches should not be unduly increased, for it may cause too great a current to be shunted from the interpole winding, with consequent liability of sparking at the brushes of the machines under conditions of heavy load unbalance.

To avoid possibility of harmful effects in commutation, due to the regulating or balancing windings 18 shunting too great a current about the interpole windings under severe unbalanced conditions, these regulating windings may include a portion disposed about the commutating poles and of such dimensions or ampere turn characteristics as to compensate to the desired extent for variation in the energizing effect of the commutating winding, and any straight compensating winding present, on the interpoles, on flow of current through the regulating windings 18 and the equalizer circuit generally. Satisfactory results may be attained in this matter by disposing about the interpoles a number of effective turns of a winding in the equalizer circuit equal to the number of effective turns of the normal interpole winding, and any straight compensating winding present, about and producing the effective energization of the interpoles. In this connection, it will be apparent that where the normal commutating winding energizing the interpoles is arranged in a different number of parallel circuits, each carrying only a portion of the total current, then the regulating winding, the number of turns of winding in that portion of the equalizer circuit about the interpole should be varied accordingly to provide the desired compensation for shunting of current about the normal or main commutating winding; and where the auxiliary winding 18 includes, as is often the case, in addition to the usual commutating winding, a section of compensating winding of conventional form bridging main field poles of the machines, the number of turns and the number of parallel circuits of the latter winding surrounding the interpole and producing a magneto-motive force therein should be considered, as well as those of the straight interpole winding, in determining the number of effective turns of compensating or balancing winding in the equalizer circuit to be placed about the interpoles; and it will be apparent that this determination or selection of the proper number of effective turns of winding in the equalizer circuit disposed about or influencing the interpoles is to the end that the effect of such latter winding will be to substantially balance or compensate for any departure from normal load conditions, with consequent shunting about the interpole winding, and any compensating winding present, of a portion of the armature current of the machine.

The portion of the regulating winding in the equalizer circuit disposed about the interpoles for compensating for effects of unbalance of load on the machines may be arranged in any suitable manner. An arrangement, for providing the required number of effective regulating turns on the main field poles and also on the interpoles, and particularly suitable for machines whose direction of rotation is not required to be reversed, is one such as is shown schematically in Fig. 2, the other features of the system being the same as in Fig. 1, wherein the section of regulating winding 18a in the equalizer circuit disposed about each main field pole MP has one or any required number of turns thereof extended, as indicated at 18b, to embrace or loop about not only the main pole but also an interpole IP adjacent thereto in the proper direction, depending upon the direction of rotation of the machine.

Another arrangement, especially suitable for each machine whose direction of rotation is required to be reversed, is one, schematically indicated in Fig. 3, wherein the auxiliary winding connected in the equalizer circuit includes two serially connected portions, one 18a about main field poles and another 18b about the interpoles each suitably dimensioned as to effective turns to produce the hereinabove described desired compensating results, with provision, in the form of a reversing switch 18c, to permit reversal of the direction of flow of current in the section 18a on the main field poles relative to direction of flow in the section 18b about the interpoles when the direction of machine rotation is reversed. It will be apparent that, with the regulating windings 18 of the machines of Fig. 1 considered as each including a section about the main field poles, and another serially connected section about the interpoles, a multiple machine system of Fig. 2 differs from that of Fig. 1 only in that the reversing switch 18c is present in Fig. 2.

While the portion of the regulating or balancing winding 18 energizing the interpoles is described hereinabove as being in series with the portion energizing the main field poles, these two portions can well be arranged in parallel to each other, the effective turns thereof being selected to produce the above described desired balancing or regulating results. If desired, as occasionally happens, that a plurality of machines be operated in parallel with a definite unbalance in load thereon, with consequent substantial flow of equalizing current therebetween, the advantages of a balancing or regulating winding on the interpoles are decidedly pronounced.

With the present invention applied to a system where both generators of each set are driven by a single motor, the generator line switches 14, 15 of each pair of generators may be associated, by mechanical or electrical interconnection, for operation simultaneously to closed and opened positions, the arrangement including provision, as through suitable auxiliary contactors on one or both switches 14, for causing closure of switches 19 which connect the regulating field windings 18 of the individual generators to their equalizer bus sections. With the line switches 14, 15 of both generators of a set actuated together, an auxiliary line switch and an auxiliary switch in the circuit of the regulating field winding 18 of each generator may be used for cutting either generator alone out of circuit, when such action is desirable.

The energizing coils of switches 25, 26 may include further contactors 32, 34, of utility particularly where line switches 14 of both generators of a pair are actuated together, actuated to closed and open positions with the several line switches 14 of the set. This provision insures that even though a tie breaker 16, 17 may be closed, the corresponding connecting switch 25, 26 and equalizer bus section will not be closed unless the line switch 14 of the generators of the particular set are closed.

It will be apparent that, instead of having the switches 19 and 26 actuated to closed and open positions through operating electromagnets responsive to closing and opening actuation of the switches 14 and tie breakers 16 and 17, respectively, desired actuation of these switches 19 and 26 may be secured by mechanical association with the actuating mechanism of the switches 14 and the tie breakers, respectively.

A particular feature of utility of the regulating field windings on the several generators connected through the equalizer bus sections is the ability of the system to counteract the effect of a voltage controller or regulator on one machine "sticking" or failing to function, whereby the particular machine would, under ordinary circumstances, be caused to be unduly over or underloaded, the corrective effect of the regulating winding in decreasing or increasing the field energization of the particular machine being such as to maintain substantially normal distribution of load on the several machines under these conditions. And with the system specifically described herein, it is possible to secure excellent voltage regulation of the individual machines where they are supplied from a common exciter or supply source, as distinguished from individual exciters for each of the machines.

In the application of features of the present invention to a plurality of motors wherein it is desired to have the motors exert torque effects, or indirectly to operate at speeds which it is desired to maintain at the same or definite proportional values, particularly where the motors are connected to drive or operate on a common load element, as in the case of a plurality of motors driving a piece of work through a continuous mill or plant, the regulating field winding 18 on each motor is so arranged that on increase in load on the particular motor, as reflected in increased armature current, a current circulates from the overloaded motor through this regulating field winding, the equalizer bus connection with which the latter is associated and through the regulating field windings of the one or more motors carrying the proportionately lighter load, this circulating current increasing the effective field energization of the overloaded motor, slowing down the same and causing it to give up a portion of its load, and decreasing the effective field energization of the other motors, and hence increasing the speed of the latter and causing the same to assume a greater share of the load, to the general end of returning the several motors toward the condition of desired load balance thereon.

It will be apparent that advantages of the present invention are attainable with a plurality of machines generally of the shunt type, i. e., having their field energization mainly of a type other than dependent on the armature current, such as may be secured through separate or self-excited shunt excitation, and arranged to supply energy to or drive a common load, through the use of regulating field windings on the machines consuming no or inappreciable energy, and hence with minimum losses, under desired conditions of load distribution, and operative to produce effective energizing effects of a desired character on the several machines substantially only on the occurrence of a disturbance or departure from the desired normal distribution of load on the several machines, and that these desired regulating effects are attainable with a minimum of expense and complication in the matter of additional connections and regulating equipment external of the machines. And there is present the very particular advantage that these desired regulating effects are readily attainable with not only two machines but also with any plural number of machines actively supplying power. And the system includes provision which insures that the desired substantially balanced distribution of load may be readily provided for as to any number of machines that are in active service, and the number of such active machines may be increased or decreased at any time with full assurance that the cutting of machines into or out of service does not adversely affect the desired load balancing regulation of the machines either remaining or newly placed in service.

Advantages of the present invention may be attained with little or no difficulty in connection with machines already installed, and it is possible to obtain greatly improved regulation in the matter of the individual machines assuming and maintaining their contemplated share of the total load throughout the full range of variation in the total load on the machines.

It should be understood that the invention is not limited to exact details of design, construction or arrangement described herein, for obvious modifications within the scope of the invention as defined by the appended claims may be apparent to persons skilled in the art.

It is claimed and desired to secure by Letters Patent:

1. In combination, an electrical power circuit, more than two direct current dynamo-electric machines, switching means for selectively connecting any two or more of said machines in parallel in electrical energy transfer relation with said power circuit, field energizing means for each of said machines, means for automatically regulating the effective field energization of each of said machines so as to promote attainment of a substantially constant proportional distribution of the loads on any two or more of the parallel connected machines, said regulating means for each of said machines comprising regulating field windings on each machine connected to the armature circuit thereof, means for establishing an equalizing connection through said regulating field windings between like terminals of said machines, the current path through said regulating field windings being independent of the normal path of energy transfer between said machines and said power circuit, and said regulating field winding of each machine carrying current dependent in amount and direction of flow upon the difference of potential at like terminals of the parallel connected machines and effective to produce a regulating effect dependent upon the unbalance of load on the particular machine, and means for rendering the regulating means of each machine effective automatically on the connection of said machine in parallel with another of said machines.

2. In combination, an electrical power circuit, more than two direct current machines having operating characteristics essentially those of shunt type machines and each having a main field winding, an auxiliary field winding of the series type and a regulating field winding on said machine, means for connecting each of said regulating field windings in circuit with its own armature and the armatures of a plurality of other machines through points between the armature and the auxiliary series type winding of each of the parallel connected machines, and means for establishing the normal electrical power connection between each of said machines and said power circuit independently of the current path through the regulating field winding of said machine, said regulating windings carrying inappreciable current under conditions of normal load balance thereon and acting to vary the field magnetizing effect in dependence upon the amount and direction of the unbalance of load on the respective machines.

3. In combination, a plurality of dynamo-electric machines, switching means operable to connect said machines in parallel, each of said machines having a main field winding of the shunt type and a main commutating field winding, a regulating field winding for modifying the effective field energization due to said main field winding, and a regulating field winding for modifying the effective field energization due to said commutating field winding, said regulating field windings of each of a plurality of parallel connected machines being connected in an equalizer circuit connected to like terminals of said machines, and the path through said equalizer circuit being independent of the path through the main commutating windings of said machines, said regulating field windings having minimum energizing effect under conditions of balanced load on said parallel connected machines and having an energizing effect which is dependent upon the degree and direction of unbalance of load on the particular machine.

4. In combination, a plurality of dynamo-electric machines, switching means operable to connect said machines in parallel, each of said machines having a main field energizing winding of the shunt type and a commutating field winding, a regulating field winding for modifying the effective field energization due to said main field winding, a regulating field winding for modifying the effective field energization due to said commutating field winding, said regulating field windings of each of a plurality of parallel connected machines being connected in an equalizer circuit to like terminals of said machine and being independent of the current path through the main commutating windings of said parallel connected machines, said regulating field windings on each machine having minimum energizing effect under conditions of balanced load on said parallel connected machines and having an energizing effect dependent upon the degree and direction of unbalance of load on the particular machine.

5. In combination, two or more direct current machines, a power bus, means for connecting each of said machines to said power bus, each of said machines having a main field winding of the shunt type, an auxiliary field winding carrying current proportional to the armature current, and a regulating field winding on said machine, a common source of excitation for the main field windings of said machines, means for automatically controlling the energizing effects of said main field windings, an equalizer circuit, means for effecting connection of said equalizer circuit to each of said machines through the regulating field winding thereof and independently of the auxiliary field winding thereof, and means for controlling the connection of each machine to said equalizer circuit with the regulating field winding of said machine effective whereby any two or more machines may be placed in service with their regulating field windings effective in response to connection of said machines in effective power transmitting relation with said power bus.

6. In combination, a plurality of dynamo-electric machines, each of said machines being provided with a main field energizing winding of the shunt type, an auxiliary field winding of the series type, and a regulating field winding on said machine, said regulating field winding being operative to produce under certain conditions a modifying effect on the field energization due to said main field winding, said regulating field windings being connected to the armature circuits of their respective machines at a point between the armature thereof and said auxiliary series winding, an electrical distribution circuit, means for connecting said machines in parallel in electrical energy transfer relation with said distribution circuit independently of their regulating field windings, an equalizer circuit, and means for connecting said equalizer circuit through the regulating field winding of each of said machines to the armature of said machine, said regulating field windings of a plurality of said machines, when the latter are connected in parallel to said distribution circuit, carrying current wholly dependent in value and direction upon the degree of unbalance of load upon said parallel connected machines.

7. In combination, an electrical power circuit, more than two dynamo-electric machines having operating characteristics essentially those of shunt type machines, each of said machines being provided with a main field winding of the shunt type, an auxiliary field winding of the series type, and a regulating field winding on said machine, said regulating field winding being operative under certain conditions to produce a modifying effect on the field energization due to said main field winding, a common source of excitation for the main field windings of said machines, an equalizer circuit, means for connecting said equalizer circuit to the armature of each of said machines through said regulating field windings and independently of said auxiliary series field windings at points normally of like potential, and means for connecting said machines in parallel in electrical energy transfer relation with said power circuit independently of said regulating field windings, said regulating field windings producing energizing effects which modify the field energization due to said main field windings and are dependent only upon the degree of unbalance of load on the parallel connected machines.

8. In combination, an electrical power circuit, more than two dynamo-electric machines having operating characteristics essentially those of shunt type machines, each of said machines being provided with a main field winding of the shunt type, and a regulating field winding on said machine, said regulating field winding being operative under certain conditions to produce a modifying effect on the field energization due to said main field winding, an equalizer circuit, means for connecting said equalizer circuit to each of said machines through said regulating field windings at points normally of like potential, means for connecting said machines in parallel in electrical energy transfer relation with said power circuit independently of said regulating field windings, said connecting means including means for rendering said regulating field winding of each of said machines operative and inoperative in response to placing said machine into and out of respectively parallel connected relation with one or more of said other machines.

9. In combination, a plurality of dynamo-electric machines arranged to be connected in parallel and each having a main field winding, a commutating field winding, a regulating field winding for modifying the effective field energization due to said main field winding of the machine, and a second regulating field winding for modifying the effective field energization due to said commutating field winding of the machine, and means for energizing said regulating field windings of each of a plurality of said machines, when connected in parallel, automatically in response to the direction and degree of unbalance of load on said parallel connected machines.

10. In combination, a plurality of dynamo-electric machines arranged to be connected in parallel and each having a main field winding, a commutating field winding, a regulating field winding for modifying the effective field energization due to said main field winding of the machine, and a second regulating field winding for modifying the effective field energization due to said commutating field winding of the machine, said regulating field windings of each of a plurality of said machines, when connected in parallel, being connected in an equalizer circuit between said machines, the current path through said equalizer circuit being independent of the normal current path through the commutating field windings of the parallel connected machines.

11. In combination, an electrical power circuit, a plurality of dynamo-electric machines having operating characteristics essentially those of shunt type machines, means for connecting said machines in parallel to said power circuit, each of said machines being provided with a main field winding of the shunt type and a commutating field winding of the series type, a common source of excitation for the main field windings of the said machines, and means for maintaining substantially constant predetermined division of load on said machines when connected in parallel, said means comprising a regulating field winding on each of said machines and having a terminal portion connected to the armature of said machine independently of the auxiliary series field winding thereof, said latter terminal portions of the regulating field windings of the several machines being connected to points normally of like potential, and means for connecting another terminal portion of each of said regulating field windings to a corresponding terminal portion of each of said other regulating field windings, said regulating field windings carrying no appreciable current under conditions of normal load balance on said machines and carrying a current dependent essentially upon the degree of departure of said load balance from said predetermined normal condition.

12. In combination, an electrical power circuit, more than two direct current dynamo-electric machines, switching means for selectively connecting any two or more of said machines in parallel in electrical energy transfer relation with said power circuit, field energizing means for each of said machines, means for automatically regulating the effective field energization of each of said machines so as to promote attainment of a substantially constant proportional distribution of the loads on any two or more of the parallel connected machines, said regulating means for each of said machines comprising regulating field windings on each machine connected to the armature circuit thereof, means for establishing an equalizing connection through said regulating field windings between like terminals of said machines, the current path between the armatures of said machines through said regulating field windings being independent of the normal path of energy transfer between the armatures of said machines and said power circuit, and said regulating field winding of each machine carrying current dependent in amount and direction of flow upon the difference of potential at like terminals of the parallel connected machines and effective to produce a regulating effect dependent upon the unbalance of load on the particular machine.

13. In combination, an electrical power circuit, a plurality of direct current machines having operating characteristics essentially those of shunt type machines and each having a main field winding, an auxiliary field winding of the series type and a regulating field winding on said machine, means for connecting each of said regulating field windings in circuit with its own armature and the armatures of a plurality of other machines through points between the armature and the auxiliary series type windings of each of the parallel connected machines, and means for establishing the normal electrical power connection between each of said machines and said power circuit independently of the current path through the regulating field winding of said machine, said regulating windings carrying inappreciable current under conditions of normal load balance thereon and acting to vary the field magnetizing effect in dependence upon the amount and direction of the unbalance of load on the respective machines.

14. In combination, an electrical power circuit, a plurality of dynamo-electric machines having operating characteristics essentially those of shunt type machines, means for connecting said machines in parallel to said power circuit, each of said machines being provided with a main field winding of the shunt type, and means for maintaining a substantially constant predetermined division of load on said machines when connected in parallel, said means comprising a regulating field winding on each of said machines and having a terminal portion connected to the armature circuit of said machine, with said latter terminal portions of the regulating field windings of the several machines being connected to points normally of like potential, and means for connecting another terminal portion of each of said regulating field windings to a corresponding terminal portion of each of said other regulating field windings, said regulating field windings carrying no appreciable current under conditions of normal load balance on said machines and carrying a current dependent essentially upon the degree of departure of said load balance from said predetermined normal condition.

15. In combination, an electrical power circuit, more than two direct current dynamo-electric machines, switching means for selectively connecting any two or more of said machines in parallel in electrical energy transfer relation with said power circuit, field energizing means for each of said machines, means for automatically regulating the effective field energization of each of said machines so as to promote attainment of a substantially constant proportional distribution of the loads on the parallel connected machines, said regulating means for each of said machines comprising a field energizing winding on each machine, and means for establishing an equalizing connection through said regulating field windings between like terminals of said machines, the current path through said regulating field windings being independent of the normal path of energy transfer between the armatures of said machines and said power circuit.

16. In combination, an electrical power circuit, a plurality of direct current machines having operating characteristics predominantly those of shunt type machines, each of said machines having a main field winding and a regulating field winding on said machine, said regulating field windings having one terminal portion thereof connected with the armature circuit of their respective machines at points of normally like potential, and the other terminal connected to an equalizer circuit, and means for establishing the normal electrical power connection between the armatures of each of said machines and said power circuit independently of the current path through the regulating field winding of said machine, said regulating field windings carrying minimum current under normal conditions of load balance on said machines and producing a resultant positive or negative increment of field energization on its machine dependent upon the amount and direction of departure of the load on the machine from balanced condition.

17. In combination, a plurality of direct current dynamo-electric machines, means for connecting each of said machines to a section of a power bus, means for connecting each of said power bus sections to another power bus section, an equalizer section for each of said machines, a regulating field winding on each of said machines and having one terminal connected to the armature circuit of its machine, means for connecting the other terminal of said regulating field winding to its respective equalizer section, the current path through the regulating field winding of each machine and its respective equalizer section being independent of the path of normal energy transfer between said machine and its respective power bus section, means for connecting the equalizer section of each machine to the equalizer section of another machine, and means for rendering opening and closing operations of each of said latter means responsive to opening and closing operations respectively of said means for connecting the power bus section of the particular machine to another of said power bus sections.

18. In combination, a plurality of dynamo-electric machines arranged to be connected in parallel and each having a main field winding of the shunt type, an auxiliary field winding of the series type, a regulating field winding for modifying the effective field energization due to said main field winding of the machine, and a second regulating field winding for modifying the effective field energization due to said auxiliary field winding of the machine, and means for causing the energization of said regulating field windings of each of a plurality of said machines, when connected in parallel, to vary automatically in response to the direction and degree of unbalance of load on said parallel connected machines, said means including an equalizer circuit between said machines and in which said regulating field windings are connected, the current path through said equalizer circuit being independent of the normal current path through the series field windings of the parallel connected machines.

PAUL M. STIVENDER.